(12) United States Patent
McLaren (10) Patent No.: US 12,391,431 B2
(45) Date of Patent: Aug. 19, 2025

(54) PACKAGING

(71) Applicant: MCLAREN PACKAGING LIMITED, Renfrewshire (GB)

(72) Inventor: Donald McLaren, Port Glasgow (GB)

(73) Assignee: MCLAREN PACKAGING LIMITED, Port Glasglow (GB)

( * ) Notice: Subject to any disclaimer, the term of this patent is extended or adjusted under 35 U.S.C. 154(b) by 87 days.

(21) Appl. No.: 18/283,776

(22) PCT Filed: Mar. 23, 2021

(86) PCT No.: PCT/GB2021/050704
§ 371 (c)(1),
(2) Date: Sep. 22, 2023

(87) PCT Pub. No.: WO2022/200750
PCT Pub. Date: Sep. 29, 2022

(65) Prior Publication Data
US 2024/0166405 A1    May 23, 2024

(51) Int. Cl.
*B65D 8/00*    (2006.01)
*B31B 50/26*    (2017.01)
(Continued)

(52) U.S. Cl.
CPC .............. *B65D 15/24* (2013.01); *B31B 50/26* (2017.08); *B32B 3/266* (2013.01); *B32B 29/005* (2013.01);
(Continued)

(58) Field of Classification Search
CPC ........ B65D 15/24; B65D 15/06; B65D 15/08; B65D 65/40; B65D 2565/385;
(Continued)

(56) References Cited

U.S. PATENT DOCUMENTS 5,025,981 A * 6/1991 Schellenberg ............ B65D 1/26
229/118
10,721,960 B2 * 7/2020 Buhl ...................... A24D 1/025
(Continued)

FOREIGN PATENT DOCUMENTS

DE             606606 C     12/1934
DE        27 52 647 A1      6/1979
(Continued)

OTHER PUBLICATIONS

International Preliminary Report on Patentability for PCT App. PCT/GB2021/050704 dated Sep. 12, 2023 (9 pages).
(Continued)

*Primary Examiner* — Christopher R Demeree
(74) *Attorney, Agent, or Firm* — Foley & Lardner LLP (57) ABSTRACT

Packaging, a packaging blank and a method of forming packaging are described. The specific packaging comprises a base (104); and at least one sidewall (102) projecting from the base (104) and defining with the base (104) a storage volume. The at least one sidewall (102) comprises inner and outer layers (108, 110). Each of the inner and outer layers (108, 110) comprises a line of perforations (112, 114). The lines of perforations (112, 114) of the inner and outer layers (108, 110) are substantially aligned.

11 Claims, 6 Drawing Sheets

(51) Int. Cl.
  *B32B 3/26* (2006.01)
  *B32B 29/00* (2006.01)
  *B65D 65/40* (2006.01)
(52) U.S. Cl.
  CPC ............. *B65D 15/06* (2013.01); *B65D 15/08* (2013.01); *B65D 65/40* (2013.01); *B32B 2250/02* (2013.01); *B32B 2250/26* (2013.01); *B32B 2307/72* (2013.01); *B32B 2439/62* (2013.01); *B65D 2565/385* (2013.01)
(58) Field of Classification Search
  CPC .......... B65D 5/5405; B65D 3/22; B65D 3/06; B65D 3/04; B65D 5/262; B65D 2565/384; B65D 25/205; B65D 3/264; B32B 29/005; B32B 2250/02; B32B 2250/26; B32B 2307/72; B32B 2439/62
  USPC .......... 229/201, 400, 4.5, 87.05, 202, 123.1, 229/245, 5.5, 87.01; 206/410, 830, 831, 206/400, 446; 220/359.3
  See application file for complete search history.

(56) References Cited

U.S. PATENT DOCUMENTS

| | | | | |
|---|---|---|---|---|
| 11,203,481 | B2* | 12/2021 | Ding | B65D 3/265 |
| 11,731,799 | B2* | 8/2023 | Riethmueller | B65D 3/264 |
| | | | | 229/400 |
| 2007/0295795 | A1* | 12/2007 | Clougherty | B65D 3/266 |
| | | | | 229/4.5 |
| 2014/0263338 | A1 | 9/2014 | Stolzman et al. | |

FOREIGN PATENT DOCUMENTS

| | | | |
|---|---|---|---|
| EP | 2 390 196 | B1 | 3/2014 |
| GB | 0 777 079 | A | 6/1957 |
| WO | WO-2020/099816 | A1 | 5/2020 |

OTHER PUBLICATIONS

International Search Report and Written Opinion on PCT App. PCT/GB2021/050704 dated Nov. 30, 2021 (11 pages).

* cited by examiner

PACKAGING

CROSS-REFERENCE TO RELATED APPLICATIONS

This application is a U.S. National Phase Application under 35 U.S.C. § 371 of International Application No. PCT/GB2021/050704, filed on Mar. 23, 2021, which is incorporated herein by reference in its entirety for any and all purposes.

FIELD OF INVENTION

This invention relates to packaging, a packaging blank used to form the packaging and a method of producing the packaging.

BACKGROUND OF INVENTION

It is becoming increasingly desirable to recycle packaging for environmental and sustainability reasons. Some packaging is formed from two or more elements which are formed of different materials, meaning the elements must be separated by a user before they are recycled, as waste disposal collectors do not generally permit the recycling of one object formed of two different materials.

In the case of a carton for a whisky bottle or the like, the carton is generally formed from a cardboard sidewall and a base formed from metal. It can be particularly difficult for the user to separate the cardboard sidewall from the metal base because the carton is formed to be very strong so it can maintain its structural integrity when it is subjected to significant stress by the whisky bottle or the like in use. This in turn means that cartons for whisky bottles and the like are not generally recycled, leading to increased landfill and environmental damage.

It is an object of the present invention to mitigate or obviate at least one problem with prior packaging.

SUMMARY OF INVENTION

According to a first aspect of the present invention, there is provided a packaging blank comprising:
  a first layer; and
  a second layer on top of the first layer,
  wherein the first layer is laterally offset from the second layer such that a first portion of a top surface of the first layer is exposed at a first side of the blank and such that a second portion of an under surface of the second layer is exposed at a second side of the blank,
  wherein each of the first and second portions comprises a line of perforations which extends longitudinally along the length of the blank.

The first and second lines of perforations may be straight. The first portion may have a width in the range of 15 mm to 25 mm. The second portion may have a width in the range of 15 mm to 25 mm.

The first and second layers may be formed from a paper-based material having a density in the range of 200 gsm to 600 gsm.

The first and second portions may be arranged such that when the blank is positioned on a mandrel and the second portion is folded over the first portion the lines of perforations are aligned or vice-versa.

A first line of perforations of one of the first and second portions may be located a first lateral distance (L1) from the furthest lateral extent of the layer it is laterally offset from and the one of the first and second portions may extend at least a second lateral distance (L2) from the layer it is laterally offset from. A second line of perforations of the other one of the first and second portions may be located a third lateral distance (L3) from the furthest lateral extent of the layer it is offset from and the other one of the first and second portion may extend at least a fourth lateral distance from the layer it is offset from that is equal to L2. L2 may be equal to L1+L3. L1 may be equal to L2 minus L3. L3 may be equal to L2 minus L1.

L2 may be at least 2.5 mm. L2 may be a distance in the range of 2.5 mm to 10 mm. L2 may be in the range of 3.0 mm to 10 mm, preferably 3.5 mm to 6.5 mm. L2 may be in the range of 2.5 mm to 8 mm. L2 may be in the range of 4.5 mm to 6 mm. Most preferably, L2 is in the range of 4.25 mm to 5 mm. In an optimum arrangement, L2 is 4.5 mm.

The blank may comprise a plurality of fold lines which divide the blank into a number of panels. The fold lines may facilitate forming a cuboid/tube/cylinder from the blank.

According to a second aspect of the present invention, there is provided packaging comprising
  a base; and
  at least one sidewall projecting from the base and defining with the base a storage volume, the at least one sidewall comprising inner and outer layers, wherein each of the inner and outer layers comprises a line of perforations, wherein the lines of perforations of the inner and outer layers are substantially aligned.

The base may comprise a channel portion for receiving the at least one sidewall. The at least one sidewall may be fitted into the channel portion.

The channel portion may comprise two opposing contact surfaces, wherein when the sidewall is attached to the base the at least one sidewall is positioned between the two contact surfaces and each contact surface abuts the at least one sidewall.

The channel portion may define a channel. The two opposing contact surfaces may be inner and outer contact surfaces, the outer contact surface being located outwardly further away from the centre of the base than the inner contact surface. The outer contact surface may be provided upon a sidewall lip which projects into the channel.

The outer contact surface provided upon the sidewall lip may be parallel to the inner contact surface.

The sidewall lip may comprise a free end which is rounded.

The base may be formed of metal or a plastics material.

At its first side the outer layer may comprise a first offset portion which is offset from and extends beyond a first side of the inner layer. At its second side the inner layer may comprise a second offset portion which is offset from and extends beyond a second side of the outer layer. The first and second offset portions may comprise the lines of perforations of the inner and outer layers. The first offset portion may be folded over the second offset portion such that an inner surface of the first offset portion is affixed to an outer surface of the outer layer, an outer surface of the second offset portion is affixed to an inner surface of the inner layer and the lines of perforations are aligned with an internal space between them.

The second side of the outer layer may be sandwiched between the inner layer and the first offset portion. The first side of the inner layer may be sandwiched between the outer layer and the second offset portion. The first side of the inner layer may be separated from the second side of the outer layer by the internal space by a distance of at least 2.5 mm.

The distance may be in the range of 2.5 mm to 10 mm. The distance may be in the range of 3.0 mm to 10 mm, preferably 3.5 mm to 6.5 mm. The distance may be in the range of 2.5 mm to 8 mm. The distance may be in the range of 4.5 mm to 6 mm. Most preferably, the distance is in the range of 4.25 mm to 5 mm. In an optimum arrangement, the distance is 4.5 mm.

The at least one sidewall may be formed from the packaging blank of the first aspect.

According to a third aspect of the present invention, there is provided a method of manufacturing packaging:
forming a sidewall such that it includes inner and outer layers, each of the inner and outer layers comprising a line of perforations, wherein the lines of perforations are substantially aligned.
attaching the at least one sidewall to a base so as to form the packaging.

Attaching the at least one sidewall to a base so as to form the packaging may involve fitting the at least one sidewall into a channel portion of the base.

The channel portion may comprise two opposing contact surfaces and attaching the sidewall to the base involves positioning the at least one sidewall between the two contact surfaces such that each contact surface abuts the at least one sidewall.

The channel portion may define a channel. The two contact surfaces may be inner and outer contact surfaces. The outer contact surface may be located outwardly further away from the centre of the base than the inner contact surface. The method may include forming the base such that it has a sidewall lip which comprises the outer contact surface and projects into the channel.

Forming the sidewall may include:
forming the outer layer such that at its first side the outer layer comprises a first offset portion which is offset from and extends beyond a first side of the inner layer;
forming the inner layer such that at its second side the inner layer comprises a second offset portion which is offset from and extends beyond a second side of the outer layer, wherein the first and second offset portions comprise the lines of the perforations of the inner and outer layers, and
folding the first offset portion over the second offset portion such that an inner surface of the first offset portion is affixed to an outer surface of the outer layer, an outer surface of the second offset portion is affixed to an inner surface of the inner layer and the lines of perforations are aligned with an internal space between them.

Forming the sidewall may include positioning the second side of the outer layer such that it is sandwiched between the inner layer and the first offset portion, and positioning the first side of the inner layer such that it is sandwiched between the outer layer and the second offset portion, and such that the first side of the inner layer is separated from the second side of the outer layer by the internal space by a distance of at least 2.5 mm.

Forming the sidewall may include arranging the first side of the inner layer and the second layer of the outer layer such that the distance is in the range of 2.5 mm to 10 mm.

The distance may be in the range of 3.0 mm to 10 mm, preferably 3.5 mm to 6.5 mm. The distance may be in the range of 2.5 mm to 8 mm. The distance may be in the range of 4.5 mm to 6 mm. Most preferably, the distance is in the range of 4.25 mm to 5 mm. In an optimum arrangement, the distance is 4.5 mm.

BRIEF DESCRIPTION OF THE DRAWINGS

Embodiments of the present invention will now be described, by way of example only, with reference to the following drawings in which.

DETAILED DESCRIPTION OF THE DRAWINGS

Figure 1:
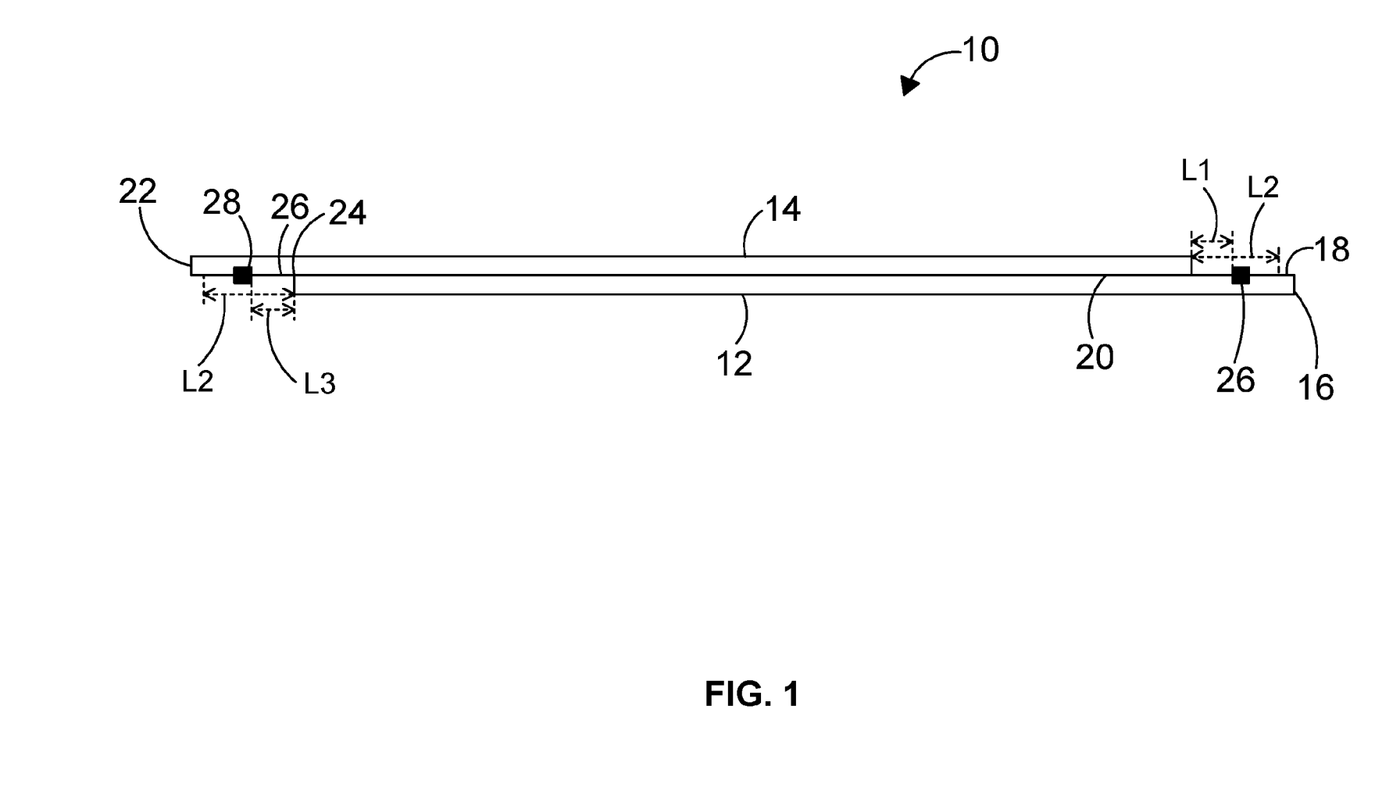
FIG. 1 shows an end view of a packaging blank according to the present invention.
Figure 2:
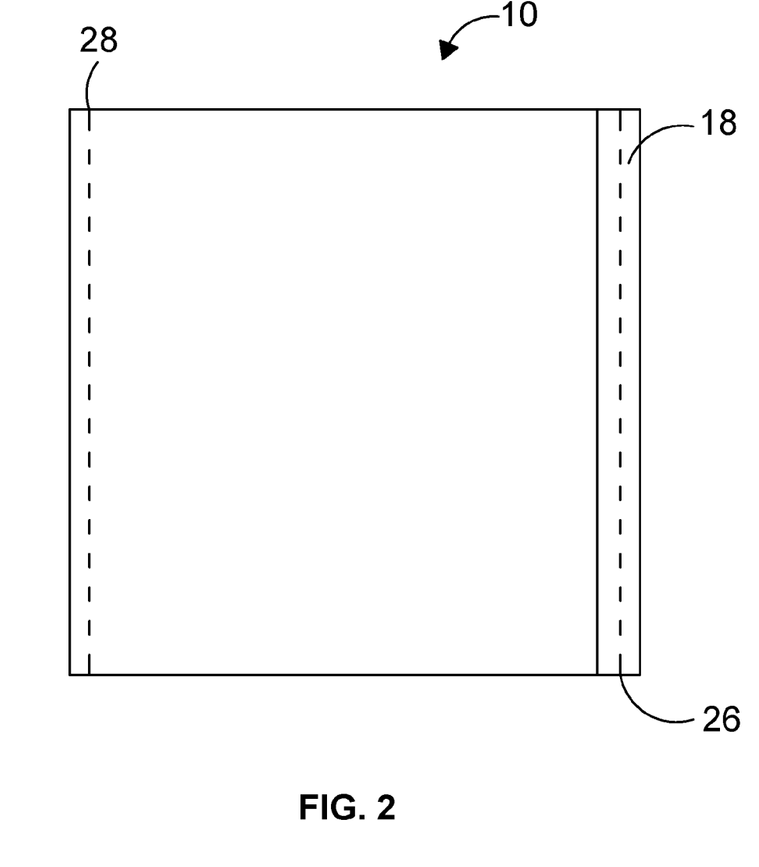
FIG. 2 shows a plan view of the blank of FIG. 1.

With reference to FIGS. 1 and 2, there is shown a packaging blank 10. The packaging blank 10 comprises a first layer 12 and a second layer 14. As best shown in FIG. 1, the second layer 14 is placed on top of the first layer 12. The second layer 14 is preferably bonded to the first layer 12 with an adhesive.

Preferably, the first and second layers 12, 14 are formed from a paper-based material, which has a density in the range of 200 gsm to 600 gsm. As shown each layer is rectangular. Each layer 12, 14 may be of the same thickness. Alternatively, the layers 12, 14 may have different thicknesses. Each of the layers may have different dimensions, for example, the first layer 12 may have a length of a 315.5 mm and a width of 281 mm and the second layer 14 may have a length of 312 mm and a width of 281 mm.

As best shown in FIG. 1, the first layer 12 is laterally offset from the second layer 14 such that a first portion 18 of a top surface 20 of the first layer 12 is exposed at a first side 16 of the blank 10 and such that a second portion 24 of an under surface 26 of the second layer 12 is exposed at a second side 22 of the blank 10. The second side 22 of the blank 10 is opposite the first side 16 of the blank.

Each of the first and second portions 18, 24 comprises a line of perforations 26, 28 which extends longitudinally along the length of the blank 10. The lines of perforations 26, 28 are indicated by the black boxes in FIG. 1. In particular, the first portion 18 is provided with a first line of perforations 26, and the second portion 24 is provided with a second line of perforations 28. Each of the first and second lines of perforations 26, 28 extends longitudinally along the length of the blank 10. This is best illustrated in FIG. 2, which shows the first and second lines of perforations 26, 28 extending longitudinally along the length of the blank 10. The blank may comprise a plurality of fold lines (not shown) which divide the blank into a number of panels. The fold lines may facilitate forming a cuboid/tube/cylinder from the blank.

The first and second portions 18, 24 are arranged such that when the blank 10 is located on a mandrel and the first portion 18 is folded over the second portion 24 the first and second lines of perforations 26, 28 align.

Each of the first and second portions 18, 24 may extend at least a first lateral distance L2 from the layer 12, 14 it is laterally offset from. In practice, L2 is the "width" of an internal space located inside a sidewall the packaging blank 10 may be used to form. This internal space is described with reference to FIGS. 3B and 4 below.

There may be a second lateral distance (L1) between the furthest lateral extent of the second layer 14 at the first side 16 of the blank and the first line of perforations 26. There may be a third lateral distance (L3) between the furthest lateral extent of the first layer 12 at the second side 22 of the blank and the second line of perforations 28. L2 may be equal to the sum of L1 and L3. L1 may be equal to L2 minus L3. L3 may be equal to L2 minus L1. This in practice ensures that the first and second lines of perforations 26, 28 are aligned with the internal space between them when the blank 10 is located on a mandrel and the first portion 18 is folded over the second portion 24. Preferably, L1 is equal to L3.

L2 may be at least 2.5 mm. L2 may be a distance in the range of 2.5 mm to 10 mm. L2 may be in the range of 3.0 mm to 10 mm, preferably 3.5 mm to 6.5 mm. L2 may be in the range of 2.5 mm to 8 mm. L2 may be in the range of 4.5 mm to 6 mm. Most preferably, L2 is in the range of 4.25 mm to 5 mm. In an optimum arrangement, L2 is 4.5 mm.

Figures 3A, 3B:
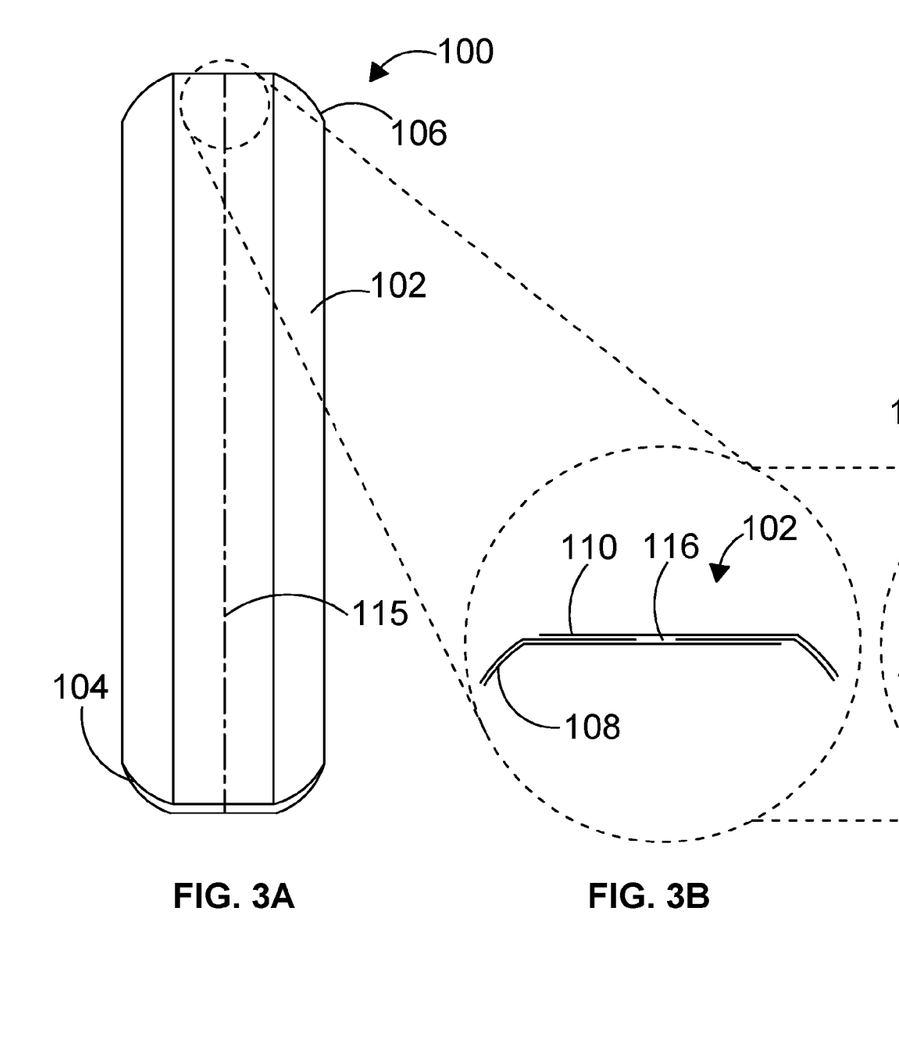
FIG. 3A shows packaging according to the present invention.
FIG. 3B shows a partial cross-section of a sidewall of the packaging of FIG. 3A.
Figure 3C:
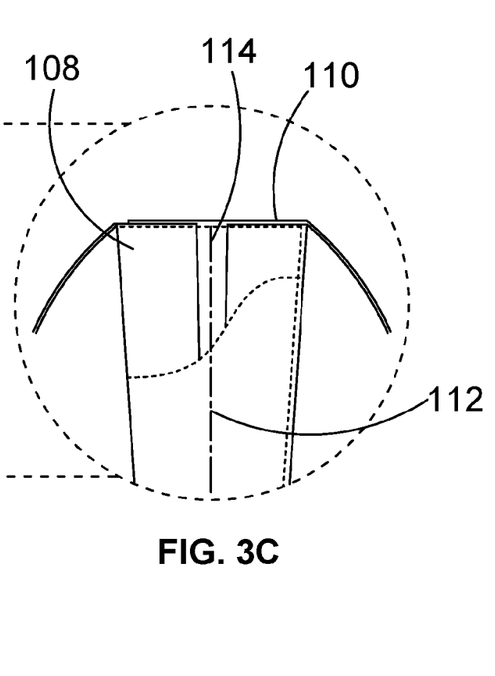
FIG. 3C shows an interior of the packaging of FIG. 3A at its upper end.

With reference to FIGS. 3A to 3C, there is shown packaging 100 according to the present invention. As shown the packaging 100 comprises at least one sidewall 102 which projects upwardly from a base 104 to define a storage volume. In practice, a whisky bottle or the like is located in the storage volume. In the depicted example shown in FIGS. 3A to 3C, the at least one sidewall 102 is open at its upper end 106. However, the upper end 106 may be closed with a lid, for example. The at least one sidewall 102 may be formed from a paper based material having a density in the range of 200 gsm to 600 gsm. Preferably, the at least one sidewall 102 is formed from the packaging blank 10 described above.

As shown in FIGS. 3A to 3C, the at least one sidewall 102 comprises inner and outer layers 108, 110. Each of the inner and outer layers 108, 110 comprises a line of perforations 112, 114. The lines of perforations 112, 114 are aligned and preferably an internal space 116 is provided between them. As shown, the lines of perforations extend longitudinally along the length of the sidewall 102. In the depicted example, the lines of perforations 112, 114 are straight. However, they may for example be curved so long as they are aligned. Preferably, the lines of perforations 112, 114 have the same configuration. In the depicted example, the perforations of the lines of perforations 112, 114 are preferably linear holes. However, the perforations may also be circular holes for example. The aligned lines of perforations 112, 114 form a line of weakness 115 in the at least one sidewall 102 which in use the user can utilise to dissemble the packaging 100 as explained below.

Figure 4:
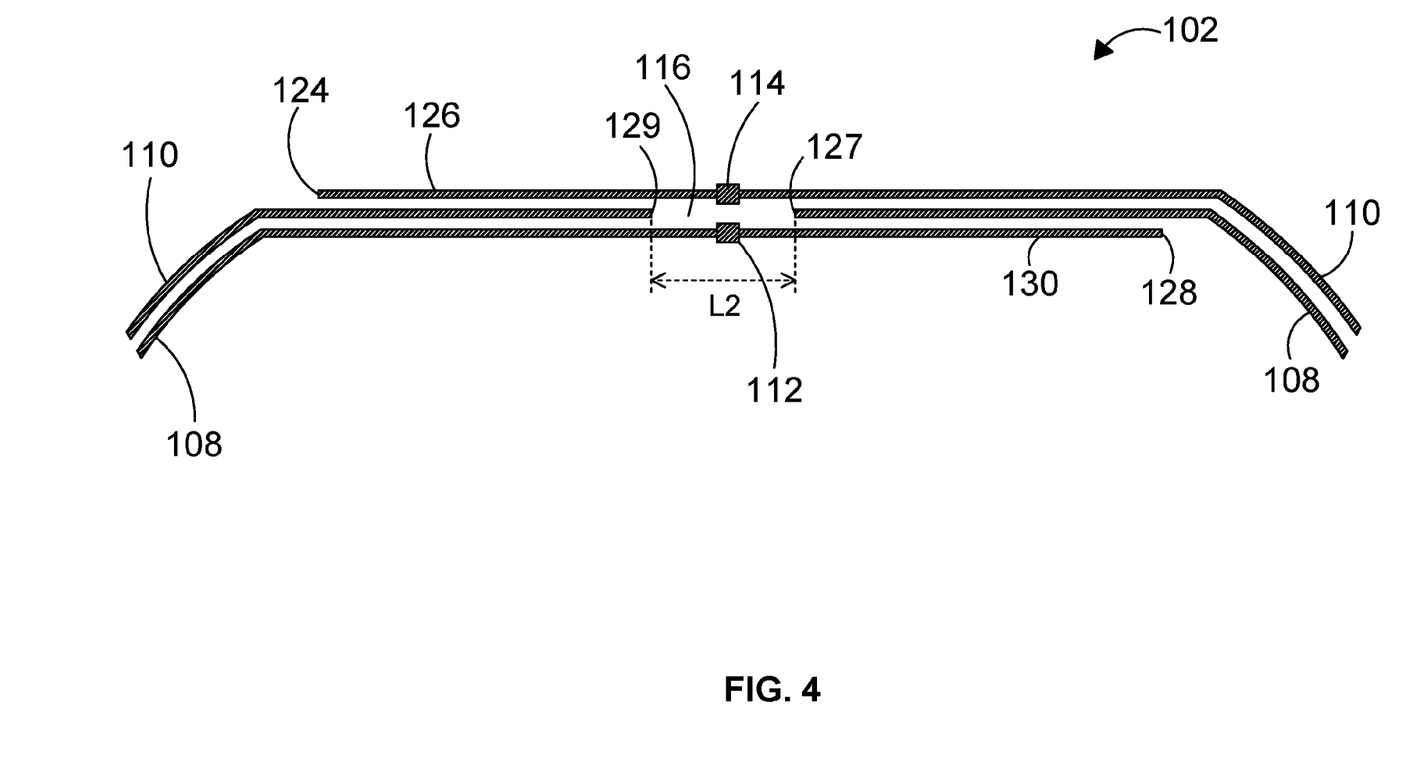
FIG. 4 is an enlarged version of FIG. 3B.

How the inner and outer layers 108, 110 may be attached to each other is shown in FIG. 3B and FIG. 4. In particular FIG. 3B, shows a partial cross-section of the at least one sidewall 102 taken across the longitudinal axis of the at least one sidewall. FIG. 4 is an enlarged view of FIG. 3B.

Where the term "side" is used below in connection with describing the arrangement shown in FIG. 3B and FIG. 4, we are referring to the furthest extent of a given portion in the clockwise/anticlockwise direction.

The inner layer 108 comprises a first line of perforations 112, and the outer layer 110 comprises a second line of perforations 114. The positions of the first and second lines of perforations 112, 114 are indicated by the black boxes in FIG. 4. As shown, the outer layer 110 comprises at its first side 124 a first offset portion 126 which is offset from and extends beyond a first side 127 of the inner layer 108 in an anticlockwise direction. As shown the first offset portion 126 comprises the second line of perforations 114. The inner layer 108 comprises at its second side 128 a second offset portion 130 which is offset from and extends beyond a second side 129 of the outer layer 110 in a clockwise direction.

The first offset portion 126 is folded over the second offset portion 130 such that an inner surface of the first offset portion 126 is bonded to an outer surface of the outer layer 110, and an outer surface of the second offset portion 130 is bonded to an inner surface of the inner layer 108. This means that the first and second lines of perforations 112, 114 are separated by an internal space 116. The first and second lines of perforations 112, 114 are aligned at opposite ends of the internal space 116. An adhesive may be used to bond the various surfaces to one another.

As shown the second side 129 of the outer layer 110 is sandwiched between the inner surface of the first offset portion 126 and an outer surface of the inner layer 108. A first side 127 of the inner layer 108 is sandwiched between the inner surface of the outer layer 110 and the outer surface of the second offset portion 130.

As shown, the second side 129 of the outer layer 110 is separated from the first side 127 of the inner layer 108 by the internal space 116. The distance by which the internal space 116 separates the second side 129 of the outer layer from the first side 127 of the inner layer is the "width" of the internal space referred to above in relation to L2 for the packaging blank 10. This distance may be referred to as a "lateral separation distance". The lateral separation distance L2 may be at least 2.5 mm. The lateral separation distance L2 may be a distance in the range of 2.5 mm to 10 mm. The lateral separation distance L2 may be in the range of 3.0 mm to 10 mm, preferably 3.5 mm to 6.5 mm. The lateral separation distance L2 may be in the range of 2.5 mm to 8 mm. The lateral separation distance L2 may be in the range of 4.5 mm to 6 mm. Most preferably, the lateral separation distance L2 is in the range of 4.25 mm to 5 mm. In an optimum arrangement, the lateral separation distance L2 is 4.5 mm.

Figures 5A, 5B:
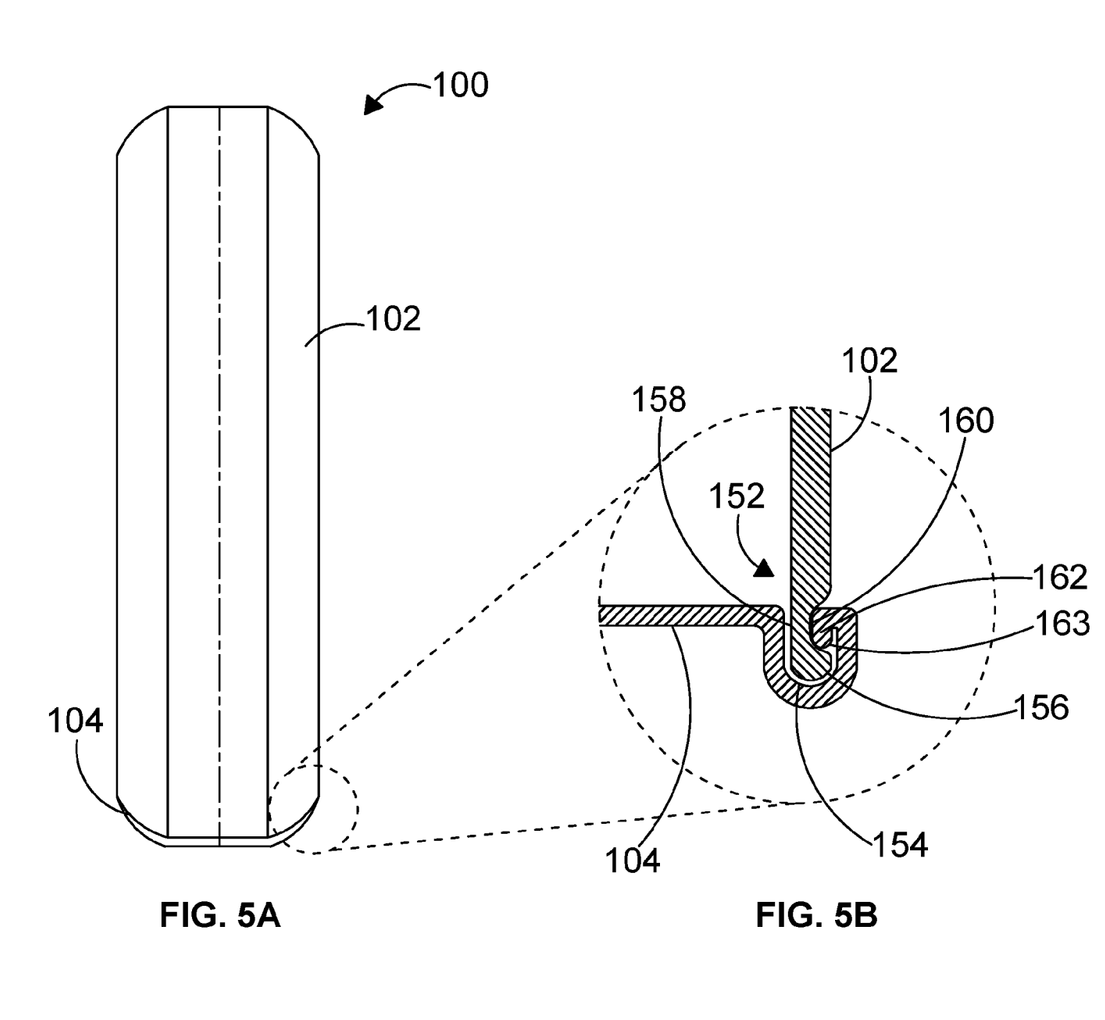
FIG. 5A shows the packaging of FIG. 3A.
FIG. 5B shows a partial cross-section of a base of the packaging of FIG. 3A.

With reference to FIGS. 5A and 5B, there is shown a particular example of the base 104 of the packaging 100. In particular, FIG. 5B shows a partial cross-section of the base 104 taken along the longitudinal axis of the packaging 100. The base 104 includes a channel portion 152 which defines a channel 154. A lower end 156 of the at least one sidewall 102 is received by the channel portion 152. The channel portion 152 comprises opposing contact surfaces 158, 160. In particular, the opposing contact surfaces comprise an inner contact surface 158 and an outer contact surface 160. The outer contact surface 160 is located outwardly further away from the centre of the base 150 than the inner contact surface 158. As shown in FIG. 4, the outer contact surface 160 is provided upon a sidewall lip 162. The sidewall lip 162 projects into the channel 154. The sidewall lip 162 may be as depicted a folded portion of the base 104. In the depicted example, the sidewall lip 162 comprises a free end 163 which is rounded. In other words, the free end 163 of the sidewall lip 162 does not comprise any straight edges. As shown, the at least one sidewall 102 is received into the channel portion 152 such that the at least one sidewall 102 is positioned between the inner and outer contact surfaces 158, 160. The sidewall lip 162 is pressed into the at least one sidewall 102 as depicted. The sidewall lip 162 may be inwardly biased.

The base 104 is preferably formed from metal, but may also be formed from a plastics material of a suitable rigidity.

INDUSTRIAL APPLICABILITY

Figure 6A:
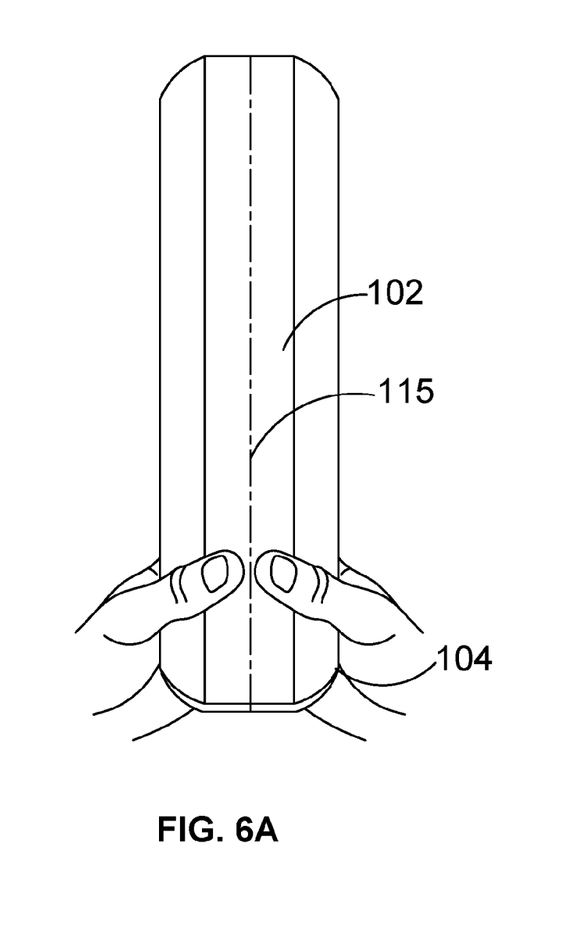
FIGS. 6A, 6B and 6C show sequential steps of a process of dissembling the packaging according to the present invention for recycling.
Figure 6B:
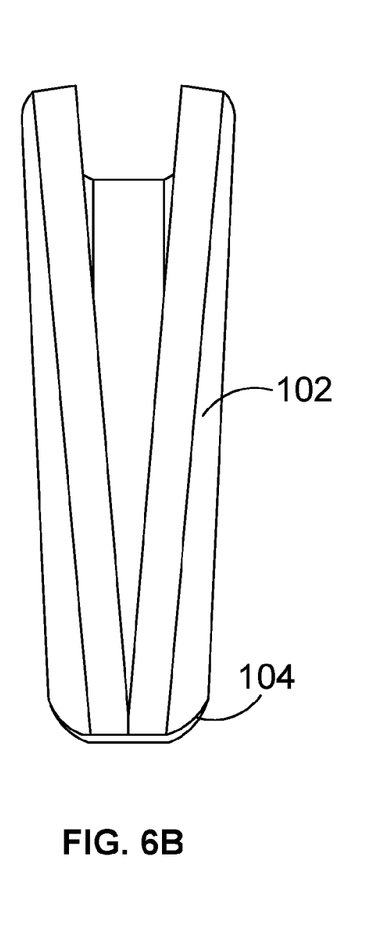
Figure 6C:
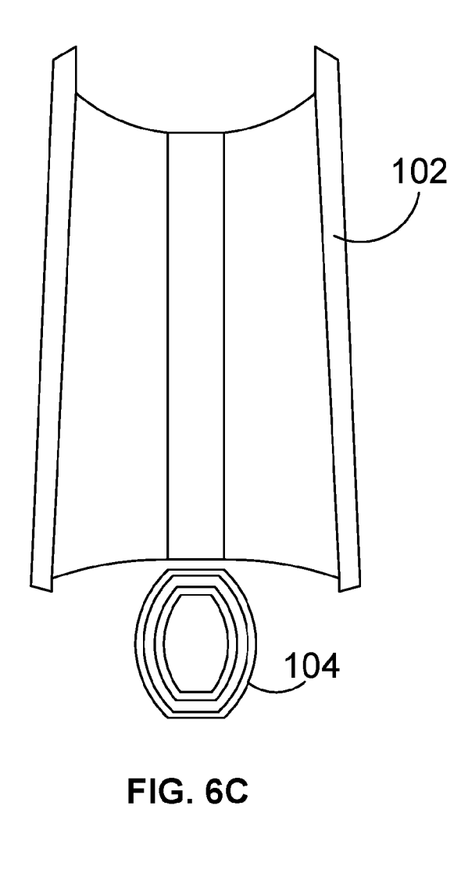

With reference to FIGS. 6A to 6C, there are shown sequential steps of a process of dissembling the packaging 100 of the present invention when the user desires to recycle the components of that packaging.

In a first step, as shown in FIG. 6A, the user simply applies pressure to the at least one sidewall 102 on either side of the line of weakness 115. This as shown in FIG. 6B causes the sidewall 102 to break along the line of weakness 115. The user can then tear the sidewall along the whole of the line of weakness 115. This then allows as shown in FIG. 6C the at least one sidewall 102 to be removed from the base 104.

The user can then ensure that the metal base and the sidewall formed from a paperboard material are recycled.

The packaging of the present invention maintains its structural integrity during use when it is subjected to significant stress by the whisky bottle or the like, but can be easily dissembled into its constituent parts by the user when the packaging needs to be recycled. This in turn makes the recycling process easier for the user, and decreases landfill and environmental damage.

The blank of the present invention can be used to form such packaging.

The arrangement of aligned lines of perforations ensure that the user can easily dissemble the sidewall.

The specific arrangement of the channel portion of the base ensures that in contrast to prior art bases that the at least one sidewall can be securely held in position in use but easily removed from the base when the packaging is to be recycled by the user.

The specific arrangement of the offset portions of the packaging blank and sidewall mean that the sidewall can be produced quickly and efficiently from paper-based materials.

The specific distance between the second side of the outer layer and the first side of the inner layer means that it is especially easy for the user to dissemble the packaging.

Modifications and improvements may be incorporated without departing from the scope of the invention, which is defined by the appended claims.

The packaging may comprise one or more sidewalls. For example, the packaging may be cylindrical, or alternatively it may be cuboidal.

For the avoidance of any doubt, the packaging may be used to package other objects aside from whisky bottles such as glass bottles filled with other alcoholic beverages, or metal objects.

The sidewall 102 may be formed from the packaging blank 10 described above, and may be formed by positioning the blank 10 on a mandrel and folding the first portion over the second portion such that the lines of perforations are aligned with an internal space between them.

The blank may comprise a plurality of fold lines which divide the blank into a number of panels. The fold lines may facilitate forming a cuboid/tube/cylinder from the blank.

The invention claimed is:

1. A packaging blank comprising:
   a first layer; and
   a second layer on top of the first layer,
   wherein the first layer is laterally offset from the second layer such that a first portion of a top surface of the first layer is exposed at a first side of the blank and such that a second portion of an under surface of the second layer is exposed at a second side of the blank,
   wherein each of the first and second portions comprises a line of perforations, wherein each of the line of perforations extends longitudinally along the length of the blank;
   wherein the line of perforations on the first portion and the line of perforations on the second portion are positioned on the first and second portions such that when the blank is folded the exposed top surface of the first portion is configured to be affixed to an outer surface of the second layer, the exposed under surface of the second portion is configured to be affixed to an inner surface of the first layer and the first and second lines of perforations are substantially aligned with an internal space between the lines of perforations;
   wherein a second side inner edge of the second layer is configured to be sandwiched between the first layer and the first portion, a first side inner edge of the first layer is configured to be sandwiched between the second layer and the second portion, and the first side inner edge of the first layer is configured to be spaced from the second side inner edge of the second layer, thereby creating an enclosed space between the first and second side inner edges and a section of the first and second portions, wherein the enclosed space provides the internal space between the lines of perforations.

2. The blank of claim 1, wherein the first and second lines of perforations are straight.

3. The blank of claim 1, wherein the first and second layers are formed from a paper based material having a density in the range of 200 to 600 gsm.

4. Packaging comprising an assembly of:
   a base; and
   the blank as claimed in claim 1, wherein the blank is formed to provide at least one sidewall projecting from the base, wherein together the at least one sidewall and the base define a storage volume,
   wherein the at least one sidewall comprises inner and outer layers, provided by the first and second layers respectively of the blank;
   wherein the inner and outer layers include the first portion and second portion, each comprising a line of perforations, wherein the first portion is affixed to an outer surface of the outer layer, the second portion is affixed to an inner surface of the inner layer such that the lines of perforations of the inner and outer layers are substantially aligned with an internal space between the lines of perforations;
   wherein a second side inner edge of the outer layer is sandwiched between the inner layer and the first portion, a first side inner edge of the inner layer is sandwiched between the outer layer and the second portion, wherein the first side inner edge of the inner layer is spaced from the second side inner edge of the outer layer, thereby creating an enclosed space between the first and second side inner edges and a section of the first and second portions, wherein the enclosed space provides the internal space between the lines of perforations.

5. The packaging of claim 4, wherein the base comprises a channel portion for receiving the at least one sidewall, wherein the at least one sidewall is fitted into the channel portion.

6. The packaging of claim 4, wherein the base is formed of metal or a plastics material.

7. The packaging of claim 4, wherein the enclosed space between the first side inner edge of the inner layer and the second side inner edge of the outer layer has a width of at least 2.5 mm.

8. The packaging of claim 5, wherein the channel portion comprises two opposing contact surfaces, wherein when the sidewall is attached to the base the at least one sidewall is positioned between the two contact surfaces and each contact surface abuts the at least one sidewall.

9. The packaging of claim 8, wherein the channel portion defines a channel, wherein the two opposing contact surfaces are inner and outer contact surfaces, the outer contact surface being located outwardly further away from the centre of the base than the inner contact surface, wherein the outer contact surface is provided upon a sidewall lip which projects into the channel.

10. The packaging of claim 9, wherein the outer contact surface provided upon the sidewall lip is parallel to the inner contact surface.

11. The packaging of claim 10, wherein the sidewall lip comprises a free end which is rounded.

* * * * *